United States Patent [19]

Reinke

[11] 4,358,055
[45] Nov. 9, 1982

[54] GUIDANCE SYSTEM FOR LATERAL MOVE IRRIGATION MACHINES

[75] Inventor: Richard F. Reinke, Deshler, Nebr.

[73] Assignee: Reinke Manufacturing Company, Inc., Deshler, Nebr.

[21] Appl. No.: 146,510

[22] Filed: May 5, 1980

[51] Int. Cl.³ .............................................. B05B 3/00
[52] U.S. Cl. .................................. 239/183; 239/184; 239/711; 239/720; 239/721
[58] Field of Search ............... 239/178, 179, 180, 181, 239/183, 184, 191, 711, 720, 721

[56] References Cited

U.S. PATENT DOCUMENTS

| | | | |
|---|---|---|---|
| 2,474,071 | 6/1949 | Stetson | 239/178 |
| 3,235,009 | 2/1966 | Nelson | 239/184 |
| 3,394,729 | 7/1968 | Bower et al. | 239/720 |
| 3,507,336 | 4/1970 | Nelson | 239/183 |
| 3,587,763 | 6/1971 | Kinkead | 239/184 |
| 3,613,703 | 10/1971 | Stout | 239/184 |
| 3,726,478 | 4/1973 | McMurray | 239/181 |
| 3,770,202 | 11/1973 | Ivemy et al. | 239/184 |
| 3,785,564 | 1/1974 | Baldocchi | 239/184 |
| 3,942,722 | 3/1976 | Ede | 239/180 |
| 4,142,547 | 3/1979 | Courtright | 239/184 |
| 4,172,551 | 10/1979 | Johnson | 239/179 |

Primary Examiner—Robert B. Reeves
Assistant Examiner—Michael J. Forman
Attorney, Agent, or Firm—Kokjer, Kircher, Bradley, Wharton, Bowman & Johnson

[57] ABSTRACT

A guidance system for maintaining a lateral move irrigation machine along its intended path of movement. The center support tower of the machine carries a guide arm which is pivotal relative to the tower about a vertical axis. A guide wheel on the arm travels in a furrow which is formed in the field to extend in the intended direction of travel of the machine. The guide wheel remains in the furrow so that if the machine departs from the desired path, relative rotation occurs between the tower and guide arm. A switch actuator is then pivoted in a direction to open a switch which deenergizes the drive motor of the end support tower which is furthest ahead.

2 Claims, 4 Drawing Figures

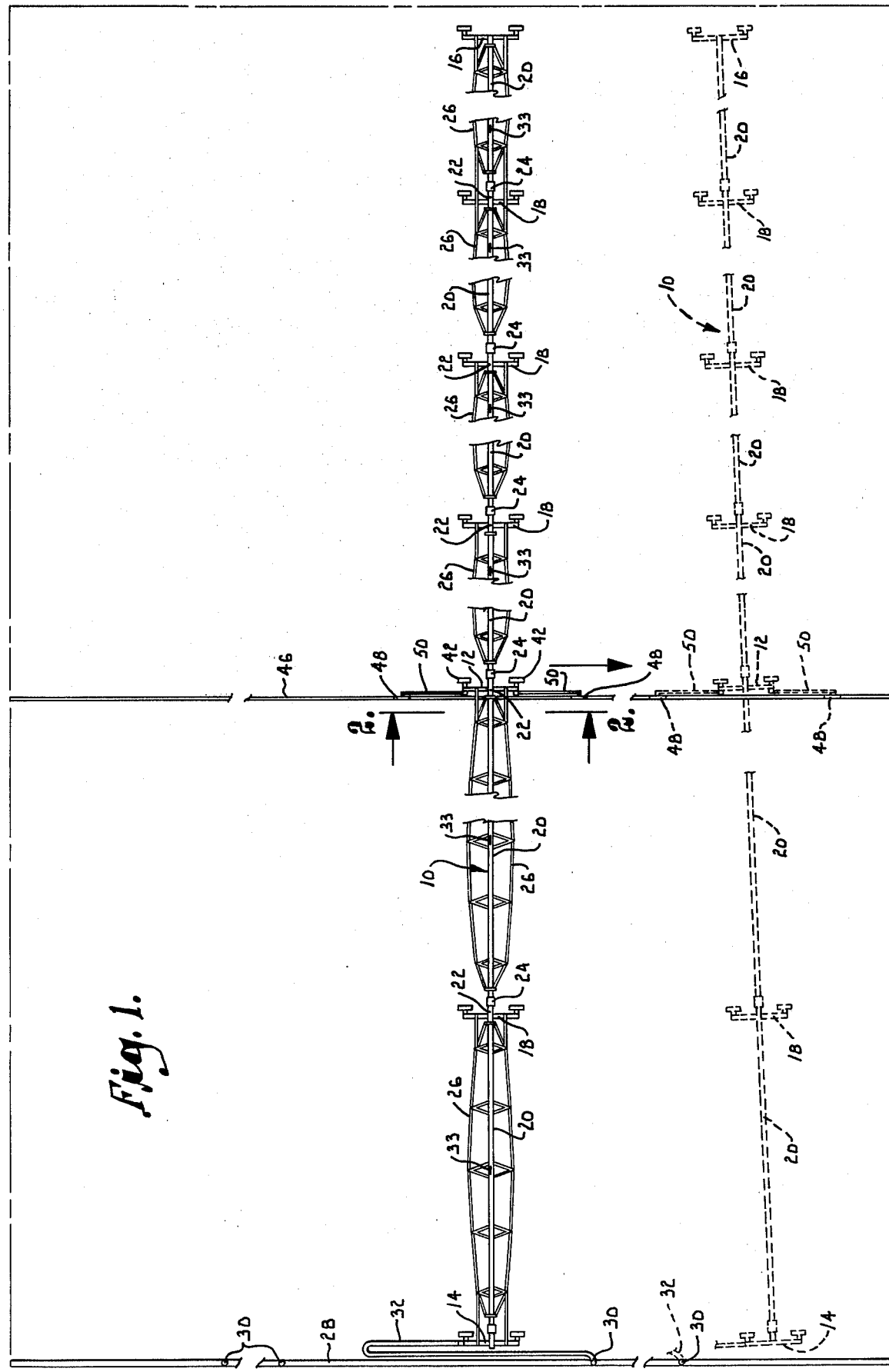

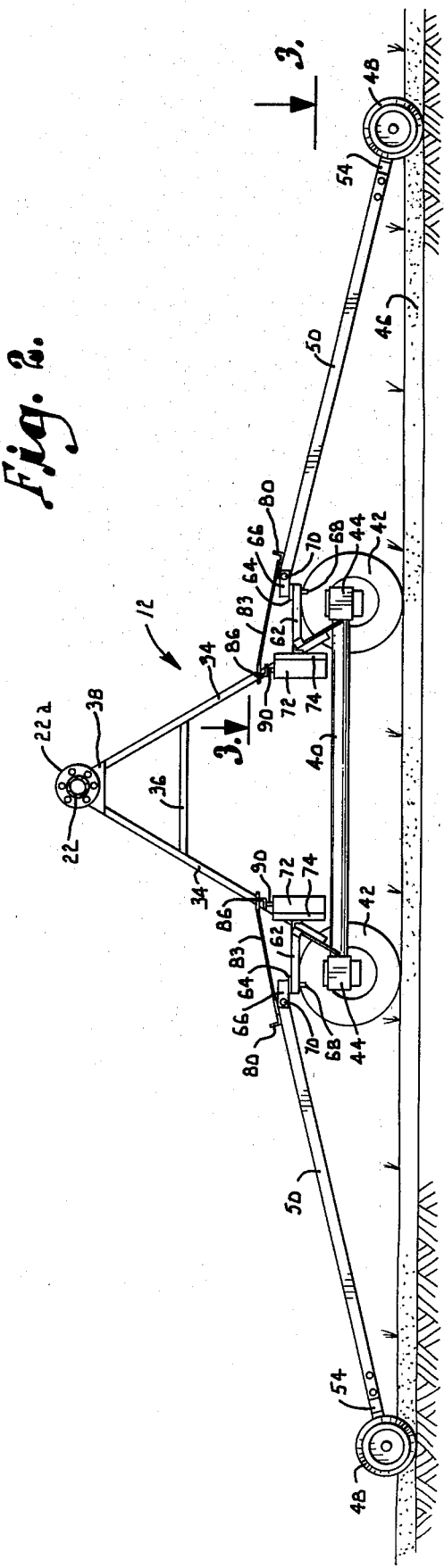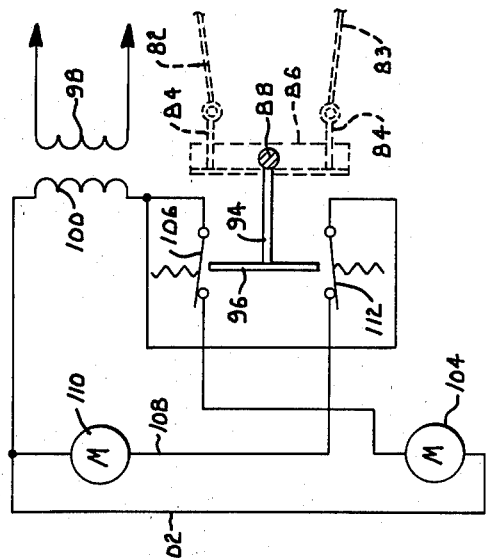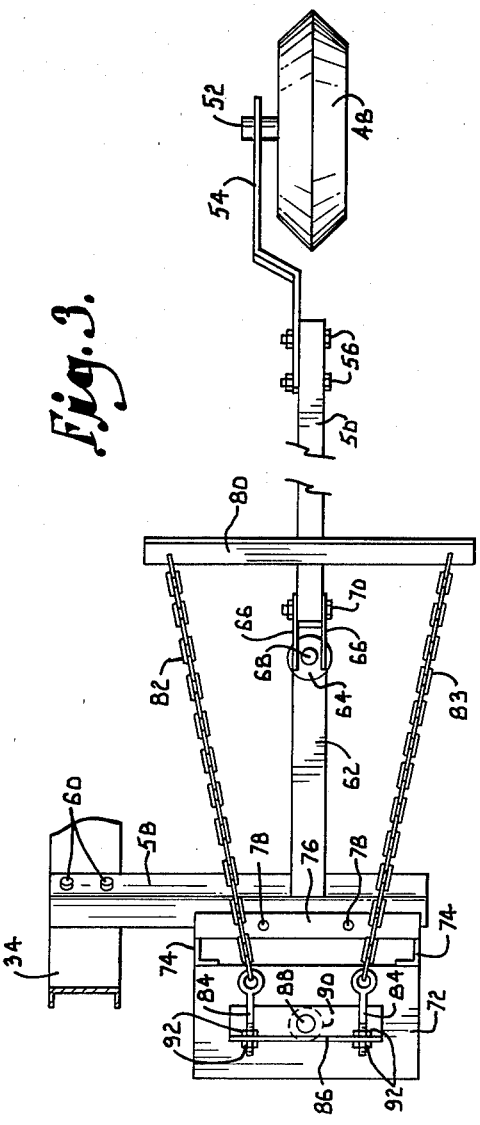

GUIDANCE SYSTEM FOR LATERAL MOVE IRRIGATION MACHINES

BACKGROUND AND SUMMARY OF THE INVENTION

This invention relates generally to irrigation equipment and more particularly to a guidance system for a lateral move irrigation machine.

Mobile irrigation systems having elevated booms are generally classified either as center pivot machines or as laterally moving machines which are also referred to as linear or in-line machines. In the center pivot machine, an upright stand pipe at the pivot point of the system supplies water to an elevated boom carried on wheeled towers. The towers are driven in a circular path centered at the stand pipe, and sprinklers spaced along the boom apply water to the field. The in-line or linear irrigation system likewise has an elevated boom carried on mobile towers. However, instead of moving in a circular path, the towers of the linear system typically travel in a straight line path which is perpendicular to the irrigation boom.

Although both types of irrigation systems have been widely used, the lateral move machine has various advantages over the center pivot machine which make the lateral move machine more desirable in many situations. For example, the towers of the center pivot machine must cross ruts in the field which generally extend in a straight line. With the center pivot system, considerable difficulty is encountered in applying adequate quantities of water to the corner areas of the square or rectangular fields in which the equipment typically operates. Moreover, greater amounts of water must be delivered to the outer end of the irrigation boom than to the areas near the pivot since the outer portions of the boom cover more surface area.

The lateral move irrigation system overcomes these problems and has additional advantages resulting from its relatively simple geometry. Even so, the lateral move machines have not been wholly without problems. Perhaps most significantly, proper guiding of the towers in straight line paths has proven to be difficult. If the towers do not move in the intended direction through the field in parallel paths, or if they move at different speeds so that the boom is not maintained in the proper alignment, the effectiveness of the irrigation suffers and the equipment can be damaged due to the added stresses which are applied to it. Even if the boom is maintained in a straight condition by an alignment system of the type usually provided, the entire irrigation system can turn such that its direction of movement is angled with respect to the intended direction of movement. As a result, the machine can move outside of the field boundaries and can damage fences and other structures as well as the irrigation equipment.

The present invention has, as its primary object, the provision of an improved guidance system for a lateral move irrigation machine which maintains the irrigation boom moving in the intended direction of travel at all times.

Another object of the invention is to provide a guidance system of the character described which is capable of accurately guiding the irrigation machine along virtually any desired path of travel. Although the furrow along which the machine is guided ordinarily provides a straight path, it can be curved or formed in any other desired shape in order to guide the machine through fields having unusual shapes.

Yet another object of the invention is to provide a guidance system of the character described which can be incorporated in various types and sizes of lateral move irrigation machines.

A still further object of the invention is to provide a guidance system of the character described which is simple and economical to construct and reliable in operation.

Other and further objects of the invention, together with the features of novelty appurtenant thereto, will appear in the course of the following description.

DETAILED DESCRIPTION OF THE INVENTION

In the accompanying drawings which form a part of the specification and are to be read in conjunction therewith and in which like reference numerals are used to indicate like parts in the various views:

FIG. 1 is a top plan view of a lateral move irrigation machine which is equipped with a guidance system in accordance with a preferred embodiment of the present invention, the broken away portions indicating continuous length of the irrigation boom;

FIG. 2 is a fragmentary side elevational view on an enlarged scale of the center support tower of the irrigation machine taken generally along line 2—2 of FIG. 1 in the direction of the arrows;

FIG. 3 is a fragmentary plan view on an enlarged scale taken generally along line 3—3 of FIG. 2 in the direction of the arrows, with the broken away portion of the guide arm indicating continuous length; and FIG. 4 is a schematic diagram of the electrical controls included in the guidance system.

Referring now to the drawings in detail and initially to FIG. 1, numeral 10 generally designates an elongted irrigation boom forming part of a lateral move irrigation machine. Boom 10 is supported at an elevated position on a plurality of mobile towers, including a central tower 12, an end tower 14, an opposite end tower 16, and a plurality of additional towers 18 located between the central tower 12 and the end towers 14 and 16. The irrigation boom 10 is carried on top of the mobile towers. The boom includes a plurality of relatively long pipe sections 20 which are coupled end to end with relatively short pipe sections 22 by flexible couplings 24. Each of the short pipes 22 is mounted on top of one of the towers. The long pipe sections 20 are reinforced by trusses 26 which extend along the underside of the boom.

Boom 10 is supplied with water which is delivered thereto from a water supply pipe 28 extending along the ground at one side of the field which is to be irrigated. Supply pipe 28 has a plurality of spaced apart water outlets 30 which may be connected with one end of a flexible hose 32. The opposite end of hose 32 is suitably connected with the end of boom 10 adjacent the end tower 14. Rather than extending along one side of the field, the supply pipe 28 may extend down the center of the field and connect with the center of the irrigation boom. Boom 10 has a plurality of spaced apart sprinklers 33 which apply water to the field.

Each of the mobile support towers is constructed in substantially the same fashion. With reference to FIG. 2, the center tower 12 is an "A" shaped structure having a pair of downwardly diverging legs 34 which are interconnected intermediate their lengths by a horizontal cross brace 36. At their upper ends, legs 34 connect with a bracket 38 to which one of the small pipes 22 forming part of the irrigation boom is attached. Pipe 22 has a flange 22a on its ends to facilitate connection with the longer pipe section 20. A horizontal pipe 40 extends between the bottom ends of legs 34 to provide a rigid base for each tower. The opposite ends of pipe 40 carry ground engaging wheels 42 which are driven by a conventional electric motor 44. The motors 44 are supplied with electricity by a generator (not shown) or by an elongate power cord (also not shown). The drive motors are reversing type motors which are able to drive each tower in both directions. The two wheels 42 for each mobile support tower are spaced apart on oposite sides of irrigation boom 10.

Referring again to FIG. 1, the towers are spaced equidistantly from one and other in a straight line extending perpendicular to the intended direction of travel of the irrigation machine. Boom 10 is maintained in a substantially straight condition by an alignment system (not shown) which may be of any desired type such as that shown in U.S. Pat. No. 3,608,826 to which reference may be made for an understanding of the details of the alignment system. The alignment system operates to selectively activate and deactivate the drive motors of the towers in a manner to prevent any of the towers from moving ahead of or lagging behind the remaining towers to an undue extent. The alignment system thus maintains boom 10 in a substantially straight condition as it travels along the field.

As thus far described, the irrigation machine and alignment system are constructed conventionally. In accordance with the present invention, a guidance system is provided to guide the irrigation machine in linear movement along the intended path of travel. The path of travel which the machine is to follow is defined by a trench or furrow 46 which is formed in the field to be irrigated. The furrow is preferably located near the center of the field and extends in a straight line if the field is rectangular, although the furrow can be curved or any other desired shape to conform with the shape of the field to be irrigated.

Referring now to FIGS. 2 and 3, the guidance system includes a pair of guide wheels 48 which are rotatably mounted on the free outer ends of guide arms 50. Each arm 50 is connected at its opposite end with the center tower 12, and the two guide arms extend from tower 12 in opposite directions so that one of the guide wheels 48 leads tower 12 as it moves along the field in one direction and the other guide wheel leads the tower as it moves in the opposite direction. Each wheel 48 is preferably tapered toward its periphery and is closely received within the furrow 46 for movement along the length of the furrow. Furrow 48 has a similarly tapered profile. A stub axle 52 extending from each wheel 48 is journaled for rotation on a bracket 54 which is bolted at 56 to the free end of arm 50. The mounting arrangement and manner of operation of each arm 50 is identical, and the components associated with only one of the arms will be described in detail, it being understood that the other guide arm is arranged in the same fashion.

An arm 58 in the form of a square tube is bolted at 60 to one of the legs 34 of tower 12. Arm 58 projects horizontally from leg 34 and connects at a right angle with another arm 62 which is welded or otherwise suitably secured to arm 58. A small disc 64 carrying a pair of spaced apart plates 66 is pivotally connected with the outer end of arm 62 by a vertical pivot pin 68. The inner end of guide arm 50 is connected between plates 66 by a horizontal pivot coupling 70. The guide arm 50 is thus mounted to pivot about the horizontal axis of coupling 70 in order to accommodate varying terrains while maintaining guide wheel 48 on the bottom of furrow 46. Guide arm 50 is also mounted for pivotal movement relative to tower 12 about the vertical axis of pin 68. It is noted that the vertical pivot pins 68 about which guide arms 50 are pivotal are located on opposite sides of boom 10 and are more distant from the boom than the axes of rotation of the respective wheels 42 of the center tower 12.

An enclosed control box 72 is supported on each mounting arm 58. One side of box 72 is secured to a pair of vertical angles 74 having a horizontal angle 76 welded thereto. A pair of bolts 78 connect angle 76 to arm 58 in order to mount the control box 72. Preferably, bolts 78 are equipped with suitable springs (not shown) which provide a resilient connection of angle 76 to the mounting arm 58 in order to maintain the chains which will subsequently be described under tension.

Guide arm 50 carries a bracket arm 80 in the form of an angle welded at its center to the top surface of arm 50. Bracket arm 80 is perpendicular to arm 50 and has its ends located outboard of the guide arm. A pair of flexible chains 82 and 83 are hooked at one end to the opposite end portions of arm 80 and at their opposite ends with eye bolts 84 which project from a relatively short arm 86. Arm 86 is mounted on top of a vertical rod 88 which extends downwardly into box 72 through a bushing 90 which journals the rod for rotation. Rod 88 connects with the center of arm 86, and the eye bolts 84 are located equidistantly from rod 88 on opposite sides thereof. Each eye bolt 84 is attached to arm 86 by a pair of nuts 92 which may be loosened to permit axial adjustment of eye bolts 84 in order to adjust the tension of the chains 82 and 83 and the angular relation between arms 86 and 80.

FIG. 4 illustrates schematically the electrical controls of the guidance system which are contained within box 72. Extending rigidly from rod 88 is a bar 94 which carries an arm at its opposite end. Arm 96 serves as a switch actuator and is connected at its center with arm 94. Electrical power is furnished to the primary coil 98 of a transformer having a secondary coil 100. A conductor 102 extending from the secondary coil 100 leads to the drive motor 104 which powers the wheels of end tower 14 in the same manner described in connection with the drive motor 44 of the center tower 12. Conductor 102 leads through motor 104 and a normally closed switch 106 back to the opposite side of coil 100. Another conductor 108 connects with opposite sides of the secondary coil 100 through the drive motor 110 of tower 16 and a normally closed switch 112. When switch 106 is in its normally closed position, conductor 102 provides a completed circuit through motors 104 to energize them, while switch 112 when closed similarly completes the circuit through motors 110. Switches 106 and 112 are located adjacent the opposite ends of actuator arm 96. The arrangement of arms 94 and 96 is merely a schematic representation of one manner of actuating switches 106 and 112, and it is to be understood that alternative means for actuating the switches may be provided, such as a proximity switch or a cam (not shown) carried on rod 88.

In operation, the drive motors of all of the towers 12, 14, 16, and 18 propel the irrigation machine along the field that is undergoing irrigation. The guide wheels 48 travel in furrow 46 and are restricted to movement therein due to engagement of opposite sides of the wheels with the banks of the furrow. The irrigation machine is thus propelled along the field in the direction indicated by the directional arrow in FIG. 1, and sprinklers 33 apply water to the field in a uniform pattern of distribution. The alignment system of the irrigation machine prevents any of the towers from moving ahead of or lagging behind the other towers. Boom 10 is thereby maintained in a straight condition and is oriented substantially perpendicular to the direction of movement of the irrigation machine.

The guidance system of the present invention resists any tendency of the machine to depart from the intended direction of movement. If the entire boom 10 turns in the manner indicated in broken lines in FIG. 1, for example, the alignment system will not initiate corrective measures since the boom remains in a straight condition. However, such turning of the machine causes the center tower 12 to turn slightly to the left of the path of travel. Such turning of the center tower results in relative rotation between it and the guide arm 50 which leads the machine through the field, since the guide wheel 48 remains in furrow 46. The center tower 12 pivots counterclockwise as viewed in FIG. 3 about the vertical axis of pin 68, and chain 82 pulls on the end of arm 86 to pivot the arm clockwise.

As best shown in FIG. 4, the clockwise movement which is imparted to rod 88 carries the switch actuating arm 96 in a direction to open switch 106. This deenergizes the drive motor 104 of tower 14, causing tower 14 to stop. The alignment system of the irrigation machine subsequently deenergizes the motors of the remaining towers until the opposite end tower 16 has advanced far enough that the irrigation boom 10 is again oriented perpendicular to furrow 46 and the machine is again positioned to move in the direction of the furrow. At this time, arm 96 releases switch 106 which then closes to effect energization of motor 104.

If the machine should tend to turn in the opposite direction, the relative rotation between guide arm 50 and the center support tower 12 is in an opposite direction, i.e., tower 12 pivots clockwise about pin 68 relative to arm 50. The tension of chain 83 then pulls the end of arm 86 in a direction to turn rod 88 counterclockwise, thereby carrying arm 96 in a direction to open switch 112. The drive motor 110 for tower 16 is then deenergized until boom 10 is again oriented perpendicular to furrow 46, at which time arm 96 releases from switch 112 to effect energization of motor 110. The machine is thus guided along the intended path of travel with boom 10 maintained perpendicular to furrow 46.

When the irrigation machine reaches the end of the field, the direction of the drive motors is reversed and it begins moving back through the field in an opposite direction. The other guide arm then leads the machine and serves to guide it along the field in the manner indicated previously. The guide arm which is effecting guidance of the machine is preferably the arm which leads the machine through the field since it can then anticipate any tendency of the machine to begin turning and correct the direction of the machine before it departs unduly from the intended direction of movement. The overall result is a more responsive guidance system which automatically guides the irrigation machine along the field. Preferbly, the guide wheel leads the machine by approximately 25 feet. If the guide wheel is located near the center tower, overcorrection of the machine can result and it can weave back and forth to an excessive extent. Locating the guide wheel well ahead of the irrigation machine results in more effective steering and maintaining of the machine along the intended path of travel without undue weaving, primarily because a long guide arm is not as sensitive to small deviations as a short guide arm. Therefore, the corrections that are effected by a long guide arm provide the irrigation machine with a smoother path than occurs with a relatively short arm which can cause jerky corrections and weaving motion of the irrigation system. It should also be pointed out that any tendency for the center tower 12 to shift sideways is counteracted by the guidance system, and the center tower is thus maintained in the proper position at all times.

Preferably, the tower 12 which carries guide arms 50 is the tower located at the center of boom 10, although it need not be. Also, furrow 46 can be formed in a straight line for irrigation of rectangular fields and in other shapes for fields of different configurations. The guide wheels 48 remain in furrow 46 to maintain the machine moving in the direction of the furrow to thereby guide it along the desired path of movement.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. In a lateral move irrigation machine having a plurality of mobile support units spaced apart in a substantially straight row, an elongate irrigation boom mounted on said support units at an elevated position above the field to be irrigated, a pair of gound engaging wheels on each support unit spaced apart on opposite sides of the boom and rotatable about axes of rotation located at the centers of the wheels, means for supplying water to said boom, a plurality of outlets spaced along the boom for applying water to the field, and drive means for each support unit for driving same through the field, an improved guidance system comprising:

means defining a linear path extending along the field in a preselected direction which the boom is to follow with the boom extending substantially perpendicular to said path;

a pair of elongate guide arms;

means for coupling both guide arms with an intermediate support unit in a manner permitting the guide arms to pivot relative to said intermediate support unit about generally vertical pivot axes offset from the irrigation boom and spaced apart from one another on opposite sides of the boom at locations more distant from the boom than the axes of rotation of the respective wheels of the intermediate support unit, said guide arms projecting from said axes in opposite directions whereby one guide arm leads the boom during movement of same along the field in one direction and the other guide arm leads the boom during movement of same along the field in the opposite direction;

a guide member carried on each guide arm, said guide members being restricted to movement along said path to thereby effect relative pivotal movement between said guide arms and said intermediate support unit upon deviation of said intermediate unit from said preselected direction;

means responsive to relative pivotal movement between said one guide arm and said intermediate support unit for controlling the drive means of selected support units on opposite sides of said intermediate unit in a manner to prevent either end of the boom from moving ahead of or behind said intermediate unit when the boom is moving in said one direction; and means responsive to relative pivotal movement between said other guide arm and said intermediate support unit for controlling the drive means of said selected support units in a manner to prevent either end of the boom from moving ahead of or behind said intermediate unit when the boom is moving in said opposite direction, whereby the boom is maintained substantially perpendicular to said path as it is driven through the field.

2. The invention set forth in claim 1, wherein said path defining means comprises a furrow in the field and each guide member comprises a wheel rotatively carried on the corresponding guide arm, said wheels fitting closely in said furrow and being restricted to movement within the furrow.

* * * * *